July 19, 1966  P. KOPPENOL  3,261,039
BUOY FOR LOADING AND UNLOADING TANKERS
Filed Aug. 7, 1964  2 Sheets-Sheet 1

INVENTOR:
PIETER KOPPENOL
BY:
HIS ATTORNEY

July 19, 1966 P. KOPPENOL 3,261,039
BUOY FOR LOADING AND UNLOADING TANKERS
Filed Aug. 7, 1964 2 Sheets-Sheet 2

INVENTOR:
PIETER KOPPENOL
BY:
HIS ATTORNEY

United States Patent Office 3,261,039
Patented July 19, 1966

3,261,039
BUOY FOR LOADING AND UNLOADING TANKERS
Pieter Koppenol, The Hague, Netherlands, assignor to Shell Oil Company, New York, N.Y., a corporation of Delaware
Filed Aug. 7, 1964, Ser. No. 388,149
Claims priority, application Netherlands, Aug. 7, 1963, 296,353
1 Claim. (Cl. 9—8)

This invention relates to a buoy for loading and unloading tankers, which buoy comprises a float, a number of liquid lines secured to the float, a part which is rotatable relative to the float, a number of liquid lines secured to the rotatable part, and a movable liquid-tight connection between the first and last-mentioned liquid lines.

By means of such buoys, the liquid lines secured to the float may communicate with one or more reservoirs located on the shore or below the water in which the buoy is anchored. In normal use of these buoys, a tanker is secured to the rotatable portion by means of cables. The liquid lines secured to the rotatable part are connected to the tanker by means of hoses and thus a loading or unloading operation can be carried out. As a result of water currents and/or wind forces which occur, the tanker may be displaced and the part which is rotatable relative to the float may move. For this reason, the connection between the liquid lines secured to the float and the liquid lines secured to the rotatable part is movably constructed.

If, by means of the buoy, it is desired to load or unload simultaneously a large number of different liquids, the buoy must be provided with a large number of liquid lines. In such a case the movable or swivel connection between the liquid lines secured to the float and those secured to the rotatable part tends to be complicated. Heretofore these movable connections have been bulky and inconvenient in assembly and adjustment.

It is an object of this invention to provide a buoy, which is particularly suitable for the simultaneous loading or unloading of a relatively large number of different liquids, such as refined petroleum products, and in which a movable connection is arranged between the liquid lines secured to the float and those secured to the rotatable part of the buoy. The movable connection of the present invention is of compact and simple construction and does not project appreciably above the upper surface or deck of the buoy.

Broadly, the invention provides a buoy comprising a number of partitioned chambers, preferably placed on top of each other and fixedly secured to the float, with at least one liquid line secured to the float and communicating with a selected chamber and at least one liquid line secured to the rotatable part being movably connected to a selected chamber.

The invention will now be described with reference to the accompanying drawings wherein.

Figure 1:
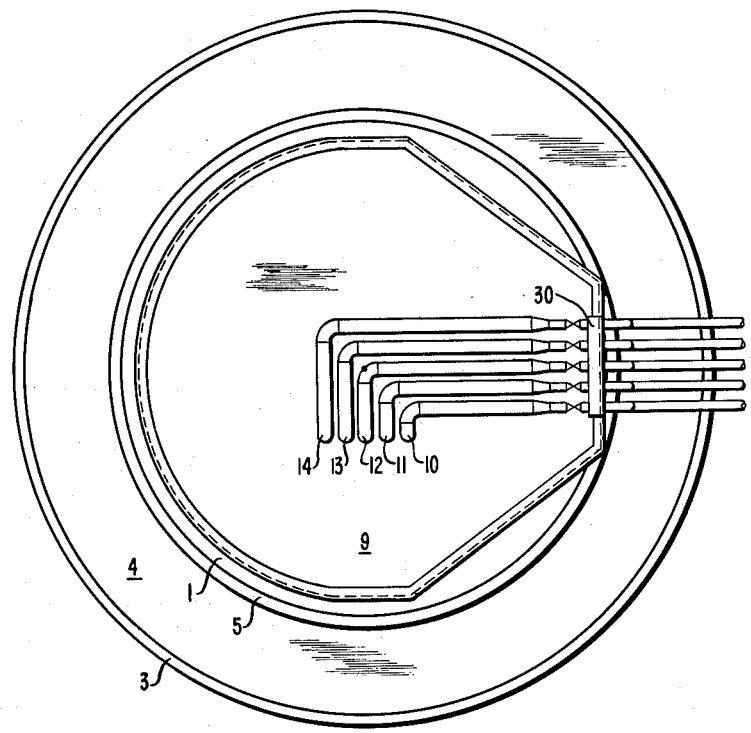
FIGURE 1 is a diagrammatic plan view of the buoy according to the invention.

As shown in the drawings, the buoy comprises a float 1, provided with a submerged fender 3 which is secured to the float 1 by means of a supporting structure 4. The float 1 is preferably constructed in the shape of a hollow ring. The support structure 4 is provided with means for securing anchor chains (not shown in the drawings) to the supporting structure, so that the buoy may be anchored on the floor beneath the water 2. The float 1 is provided on the upper side above the surface of the water with a similar fender 5. The upper surface or deck 6 of the float 1 is provided with circularly bent rails 7, along which run vertical rollers 8. The rollers 8 are secured by their spindles to a movable part or turntable 9, situated above the deck 6 of the float 1.

Figure 2:
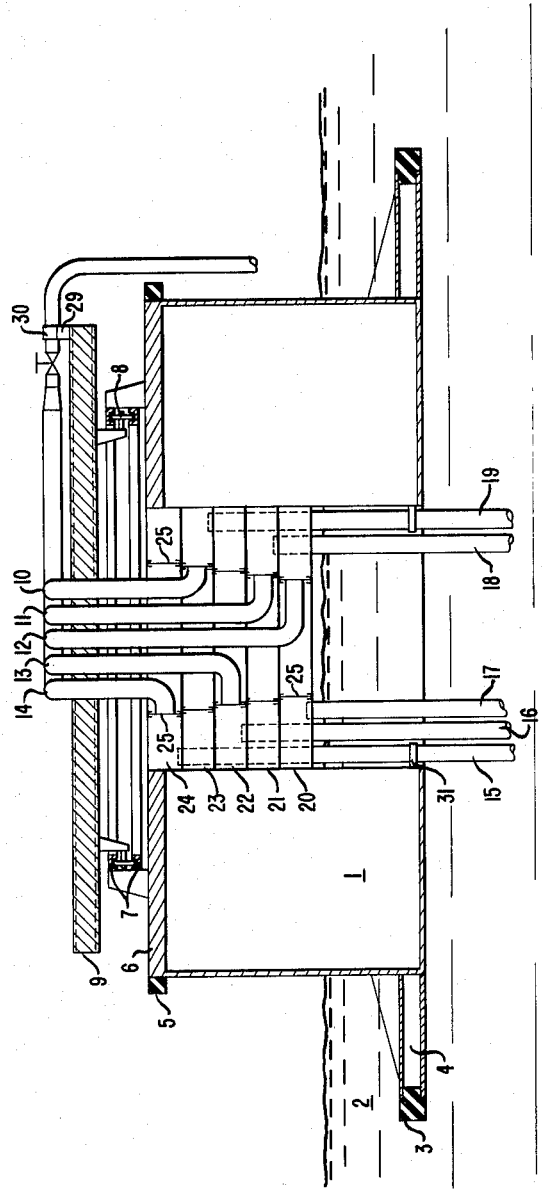
FIGURE 2 is a lateral diagrammatic view, partially in section, of the buoy according to the invention; and, FIGURE 3 is an enlarged fragmentary sectional view, taken on a radial plane, illustrating a movable connection according to the invention.

Liquid conduits 10, 11, 12, 13 and 14 are secured to the turntable 9 by means of supports 29 and clamps 30, whereat a coupler (not shown) may be provided. The ends of these conduits leading away from the float 1 beyond the clamp 30 may be flexible for easy connection to a tanker moored at the buoy. The liquid conduits 15, 16, 17, 18 and 19 are fixedly secured to the float 1 by means of clamps 31. Coupling means (not shown) are provided on the lower ends of conduits 15–19 for connection with pipelines on the bottom of the sea, sometimes called "shore lines." As shown in FIGURE 2, the float 1 is provided with a number of circular cylindrical chambers 20, 21, 22, 23 and 24. Each of said chambers 20–24 is provided at its radially inner side with a vertical, rotatably movable, circular wall 25. The other walls of these chambers are stationary relatively to the float. In addition, the center lines of the circular chambers preferably coincide with the vertical center line of the float 1.

Figure 3:
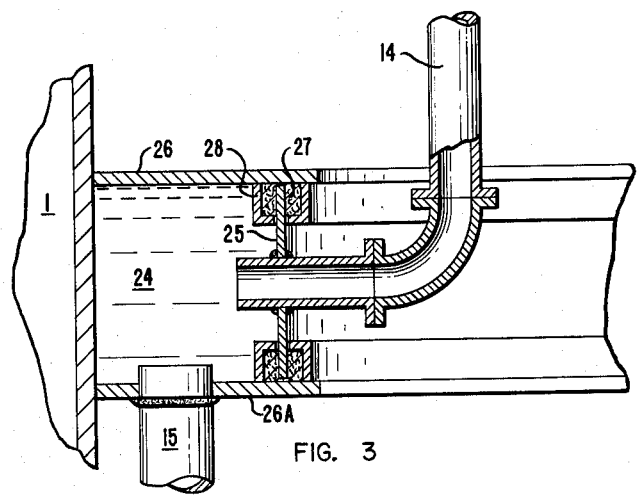

As best shown in FIGURE 3, the movable wall 25 is mounted between the horizontal walls 26, 26a of each circular chamber in a rotatable and liquid-tight manner. A liquid-tight seal is provided by a suitable packing material 27 which is placed inside the slotted U-shaped flange members 28 in which the wall member 25 rotates. One of the liquid conduits 15–19 is in fluid communication with each of the circular chambers 20–24 (see FIGURES 2 and 3). Similarly one of the liquid conduits 10–14 secured to the rotatable turntable 9 is in fluid communication with each of the circular chambers 20–24 via a movable wall 25. Thus, for example, the chamber 24 is in fluid communication with the fixed liquid conduit 15 (through horizontal wall 26a) and with the movable conduit 14 (through the movable wall 25). In this manner each chamber 20–24 is in fluid communication with both a fixed liquid conduit 15–19 (which may be connected to a "shore line" in the water below the buoy) and a movable liquid conduit 10–14 (which may be connected to a tanker moored to the buoy).

During normal operation the tanker is moored to the turntable 9. The lines 10, 11, 12, 13 and 14 fixedly secured to turntable 9 are connected to the tanker by means of flexible hoses at their ends. When the ship is being loaded liquid may be pumped from a reservoir to the ship via line 15, chamber 24 and line 14, or via line 16, chamber 22 and line 13, via line 17, chamber 20 and line 12, or via line 18, chamber 21 and line 11, or via line 19, chamber 23 and line 10, respectively. When the ship is being unloaded the liquid flows in the opposite direction. Different liquids may be simultaneously pumped via the various flow paths mentioned. If the tanker is displaced as a result of water currents or the wind the turntable 9 will turn relative to the float body 1. The lines 10, 11, 12, 13, 14 and the rotatably mounted inner walls 25 of the circular chambers 20–24 connected to these lines move with the turntable 9 so that pumping can be carried on normally.

In the embodiment described, the lines 10–14 secured to the turntable 9 are connected to the rotatable inner walls 25 of the chambers 20–24. It is, however, also possible by an obvious reversal of parts to construct the outer walls of all or some of the circular chamber 20–24 to be rotatable relatively to the float and to secure these lines 10–14 to them. The embodiment shown in the drawings is generally preferred. The lines 15–19, in the embodiment according to the drawing, are secured to the bottom horizontal walls 26a of the chambers 20–24. If desired, the said lines 15–19 may be secured to the outer walls of the chambers or, if the outer walls are rotatably designed, to the fixed inner walls 25.

In the embodiment according to the drawing the outer walls of the chamber are in the shape of a cylinder. It is, however, also possible to design the outer walls in other shapes, such as a truncated cone, or a polygon, etc.

The chambers are preferably so arranged that they are situated below the deck 6 of the float 1. This has the advantage that the construction is less vulnerable and that a low construction height is achieved; this latter feature furthers the stability of the buoy.

I claim as my invention:

A water buoy for interconnecting a plurality of tubular lines located beneath the water with a ship moored to the buoy, said buoy comprising:

a. a float;
b. a plurality of vertically superposed annular chambers all formed at a point below the upper surface of said float and having top and bottom walls and a first vertically extending side wall formed at the float body;
c. a swivel means on each chamber formed by a second vertically extending, annular, radially inner wall, slidably sealed between said top and bottom walls of each chamber;
d. said slidable second wall of each chamber being formed on a substantially common radius measured from the center of the float and forming a hollow well which extends through the center of the float;
e. a first plurality of conduit means fixedly secured to said float and each communicating with a selected one of said chambers through the bottom wall thereof;
f. a second plurality of conduit means extending from the top of and rotatably mounted on said float, said second plurality of conduit means being adapted for connection with a ship moored to the buoy; and
g. each of said conduits comprising said second plurality of conduit means having a section which extends downwardly through said hollow well and radially outwardly into communication with a selected one of the slidable second walls of each chamber.

References Cited by the Examiner

UNITED STATES PATENTS

| 2,894,268 | 7/1959 | Griebe | 9—8 |
| 3,074,082 | 1/1963 | Griebe | 9—8 |
| 3,077,615 | 2/1963 | Schultz | 9—8 |
| 3,082,440 | 3/1963 | Rhedin | 9—8 |

FERGUS S. MIDDLETON, *Primary Examiner.*

R. G. BESHA, T. MAJOR, *Assistant Examiners.*